(12) United States Patent
Norton et al.

(10) Patent No.: US 9,176,370 B1
(45) Date of Patent: *Nov. 3, 2015

(54) HIGH CONTRAST REAR PROJECTION SCREEN

(71) Applicant: Google Inc., Mountain View, CA (US)

(72) Inventors: Adam E. Norton, Palo Alto, CA (US); Mary Lou Jepsen, Sausalito, CA (US); Andrei S. Kazmierski, Pleasanton, CA (US); Belle Fu, Taipei (TW)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/303,163

(22) Filed: Jun. 12, 2014

(51) Int. Cl.
*G03B 21/62* (2014.01)
*G03B 21/625* (2014.01)
*G02B 5/02* (2006.01)
*G02B 3/00* (2006.01)

(52) U.S. Cl.
CPC ............ *G03B 21/625* (2013.01); *G02B 3/0056* (2013.01); *G02B 5/021* (2013.01); *G02B 5/0242* (2013.01); *G02B 5/0278* (2013.01)

(58) Field of Classification Search
CPC ............................ G03B 21/625; G02B 5/0242
USPC .......................................... 359/460, 453, 456
See application file for complete search history.

(56) References Cited

U.S. PATENT DOCUMENTS

| | | | |
|---|---|---|---|
| 5,563,738 A * | 10/1996 | Vance | 359/614 |
| 5,724,182 A | 3/1998 | Mitani et al. | |
| 6,449,089 B1 | 9/2002 | Moshrefzadeh et al. | |
| 6,466,368 B1 * | 10/2002 | Piepel et al. | 359/456 |
| 6,469,830 B1 | 10/2002 | Dubin et al. | |
| 6,535,333 B1 * | 3/2003 | Piepel et al. | 359/453 |
| 6,754,005 B2 * | 6/2004 | Goto et al. | 359/456 |
| 6,829,086 B1 * | 12/2004 | Gibilini | 359/453 |
| 7,233,439 B2 * | 6/2007 | Shimizu | 359/456 |
| 7,443,583 B2 | 10/2008 | Yamauchi | |
| 7,453,635 B2 | 11/2008 | Yeo et al. | |
| 8,233,217 B2 * | 7/2012 | Kindler et al. | 359/443 |
| 2001/0040263 A1 | 11/2001 | Nakai | |
| 2002/0109916 A1 * | 8/2002 | Moshrefzadeh | 359/456 |
| 2003/0184993 A1 | 10/2003 | Yamada | |
| 2006/0061861 A1 | 3/2006 | Munro et al. | |
| 2006/0209403 A1 * | 9/2006 | Parusel et al. | 359/453 |
| 2006/0268404 A1 | 11/2006 | Hyobu | |
| 2007/0115548 A1 | 5/2007 | Ebina et al. | |

OTHER PUBLICATIONS

Duparre', J. et al., "Novel Optics/Micro-Optics for Miniature Imaging Systems", Fraunhofer Institute for Applied Optics and Precision Engineering, SUSS MicroOptics SA (2006) 15 pages.
Wolfe, C.R. et al., "Characterization of *BlackScreen*™ for Rear-Projection Television", Proc. of SPIE vol. 5002 (2003) Downloaded From: http://spiedigitallibrary.org/ on Nov. 19, 2013, pp. 97-105.

(Continued)

*Primary Examiner* — Christopher Mahoney
(74) *Attorney, Agent, or Firm* — Blakely Sokoloff Taylor & Zafman LLP (57) ABSTRACT

A projection screen includes a transparent substrate having a first side and a second side, an array of lenses disposed along the first side of the transparent substrate, a dark film disposed across the second side of the transparent substrate, an array of holes disposed through the dark film, and an array of diffusing spots each aligned with a corresponding one of the array of holes.

12 Claims, 7 Drawing Sheets

(56) References Cited

OTHER PUBLICATIONS

Morris, G.M. et al., "Engineered diffusers™ for display and illumination systems: Design, fabrication, and applications", www.RPCphotonics.com, downloaded from Internet prior to Jun. 12, 2014, 11 pages.

Sales, Tasso R.M. et al., "Light Tamers Engineered microlens arrays provide new control for display and lighting applications", Photonics Spectra, Reprinted from the Jun. 2004 issue of Photonics Spectra, 4 pages.

Vikuiti™, "Vikuiti™ Rear Projection Film", Vikuiti Display Enhancement 3M, Data sheet Oct. 2006, 3M Optical Systems Division, 6 pages.

Vikuiti™, "Vikuiti™ Rear Projection Display Screen", Vikuiti Projection Display Components 3M, 3M Optical Systems Division, downloaded from Internet prior to Jun. 12, 2014, 8 pages.

Kazmierski, A. et al., "High Contrast Rear Projection Screen for Use With a Diverging Illumination Source", U.S. Appl. No. 14/303,190, filed Jun. 12, 2014, whole document.

U.S. Appl. No. 14/303,190, filed Jun. 12, 2014, U.S. Office Action mailed Oct. 7, 2014, 17 pages.

U.S. Appl. No. 14/303,190, filed Jun. 12, 2014, U.S. Notice of Allowance mailed Dec. 8, 2014, 11 pages.

\* cited by examiner

HIGH CONTRAST REAR PROJECTION SCREEN

TECHNICAL FIELD

This disclosure relates generally to display technologies, and in particular, to rear projection screens.

BACKGROUND INFORMATION

Conventional rear projection screens use a thin diffusing layer in the form of a matte screen. An image is projected onto the back of the diffusing layer, where it is diffused and re-projected into the viewing environment. The diffusing layer provides an image surface and its diffusive nature serves to increase the viewing angles from which the image can be observed. Often these simple diffusing layer projection screens have poor contrast in well-lit rooms. This poor contrast is due, at least in part, from the scattering of ambient light back into the viewing environment, thereby deleteriously affecting the black levels and contrast of the rear projection screen.

Figure 1A:
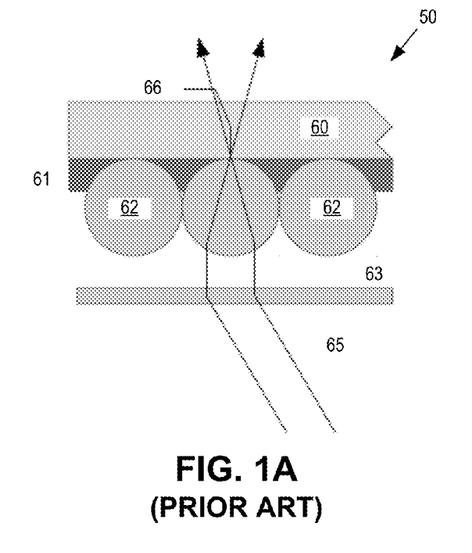
FIGS. 1A and 1B (PRIOR ART) illustrate a conventional rear projection screen using a Fresnel lens to achieve near normal incidence of light.
Figure 1B:
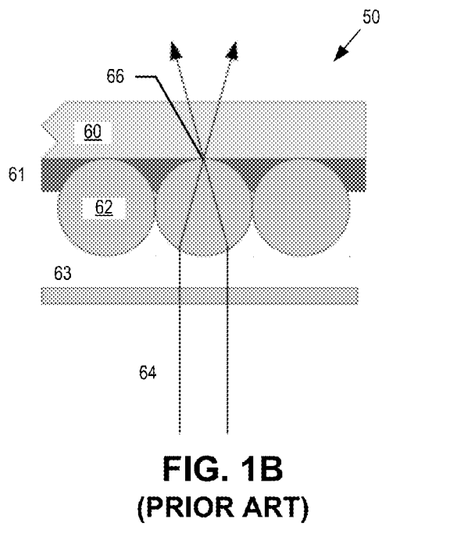

FIGS. 1A and 1B illustrate a conventional rear projection screen 50 that uses small glass spheres 62 embedded in a black adhesive 61 on a flat glass plate 60. From the top side, the majority of the screen surface is covered by black adhesive 61, thereby reducing the back reflections of ambient light and improving display screen contrast. Each glass sphere 62 forms a thin channel through black adhesive 61 and focuses incident light through a pinhole 66 that is self-aligned to a corresponding glass sphere 62. Glass spheres 62 gather the majority of the backside incident light and focus it through pinholes 66. FIG. 1B illustrates a scenario where on-axis light 64 that is perpendicular to rear projection screen 50 is focused by a glass sphere 62 through pinhole 66. However, off-axis light 65 (illustrated in FIG. 1A) must be bent using a Fresnel lens 63. Fresnel lens 63 operates to receive obliquely incident light and bend it such that the light is incident through glass spheres 62 at near normal angles to glass plate 60. The off-axis light 65 must be bent to a normal trajectory to maintain angular brightness uniformity across the front side of the screen. This design operates to maintain screen output efficiency while increasing the screen contrast in well-lit rooms. However, it requires that backside incident light be incident at a near normal angle to achieve acceptable angular brightness uniformity and uses a Fresnel lens 63 to do so.

Figure 1C:
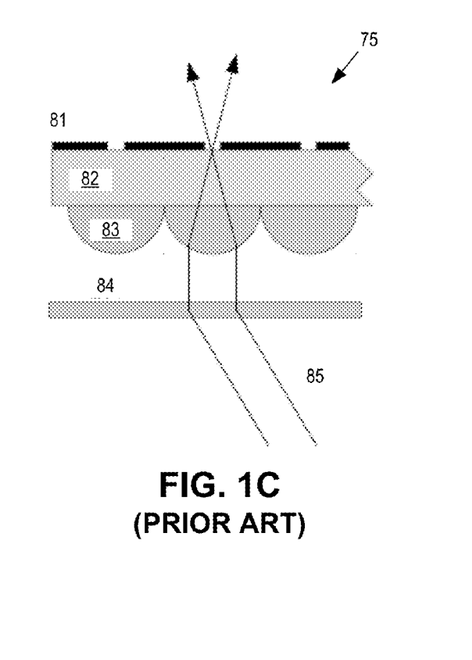
FIGS. 1C and 1D (PRIOR ART) illustrate another conventional rear projection screen using a Fresnel lens to achieve near normal incidence of light.
Figure 1D:
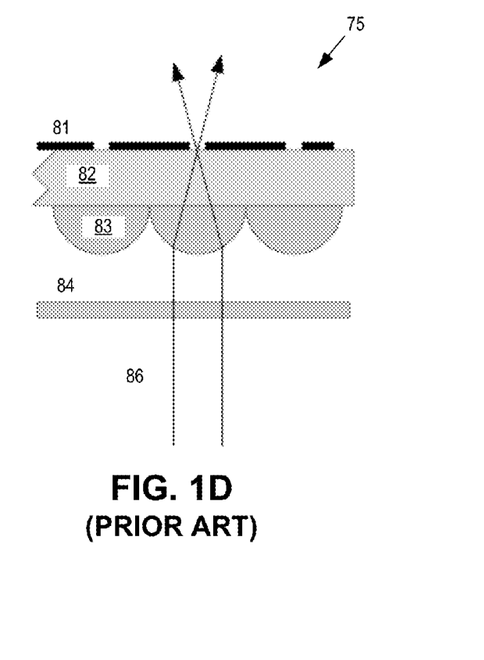

FIGS. 1C and 1D illustrate another conventional rear projection screen 75. Rear projection screen 75 operates in a similar manner to rear projection screen 50. Rear projection screen 75 includes an array of lenslets 83 replicated across the back surface of a substrate 82 having a layer of dark material 81 patterned across the top surface. Dark material 81 is patterned using a high-powered laser directed at lenslets 83. Lenslets 83 focus the beam onto dark material 81 burning or ablating away pinholes that are self-aligned to lenslets 83. Similar to rear projection screen 50, incident light must be directed onto lenslets 83 along a direction that is substantially perpendicular or normal to the surface of substrate 82. Again, normal incidence is achieved using a Fresnel lens 84. This design also operates to maintain screen output efficiency while increasing the screen contrast in well-lit rooms. However, as before it requires that backside incident light be incident at near normal angles to achieve acceptable angular brightness uniformity and uses a Fresnel lens 84 to do so.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Embodiments of an apparatus, system and method of fabrication for a high contrast rear projection screen are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 2:
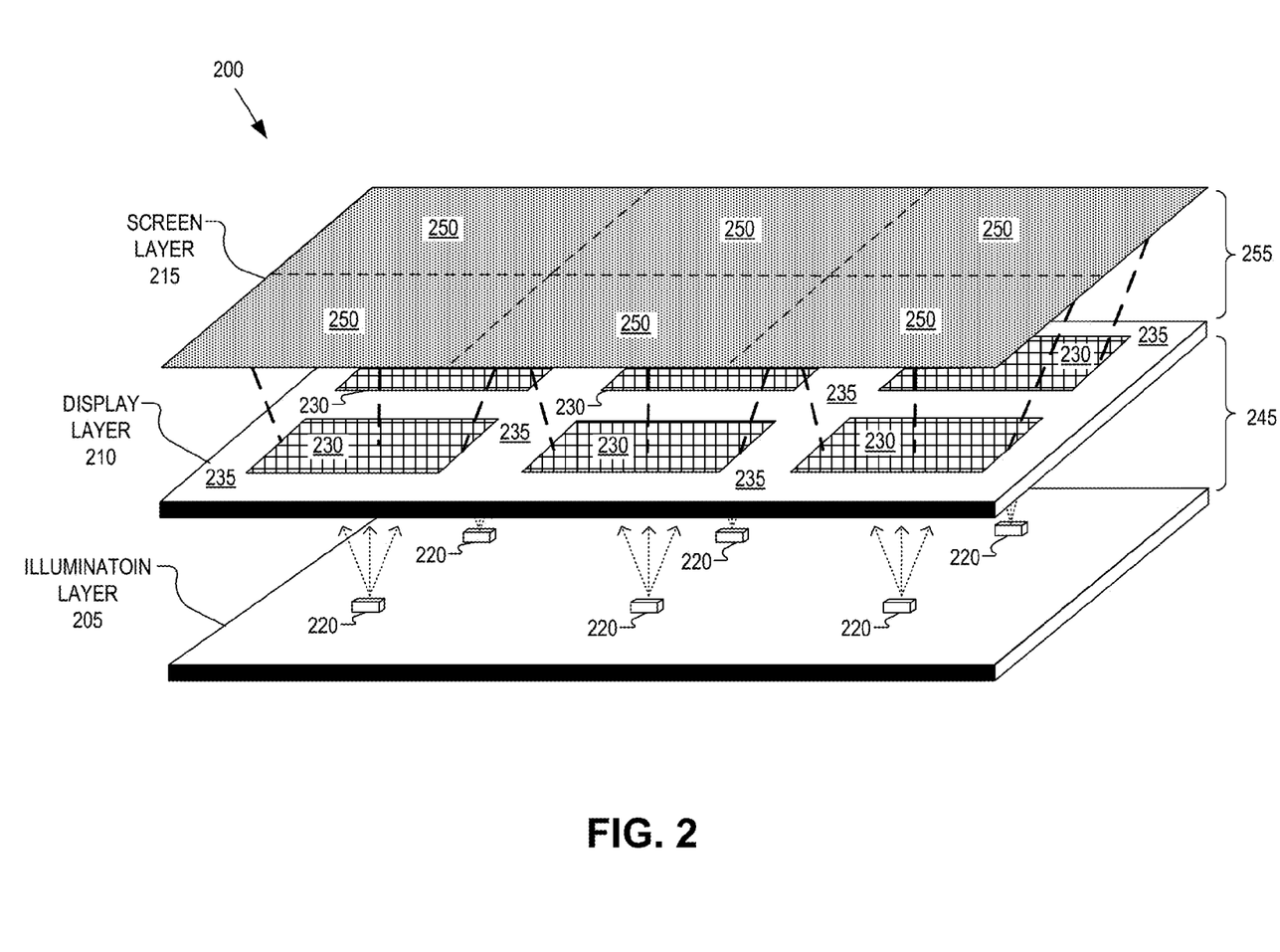
FIG. 2 is a perspective view illustrating functional layers of a rear projection display, in accordance with an embodiment of the disclosure.
Figure 3A:
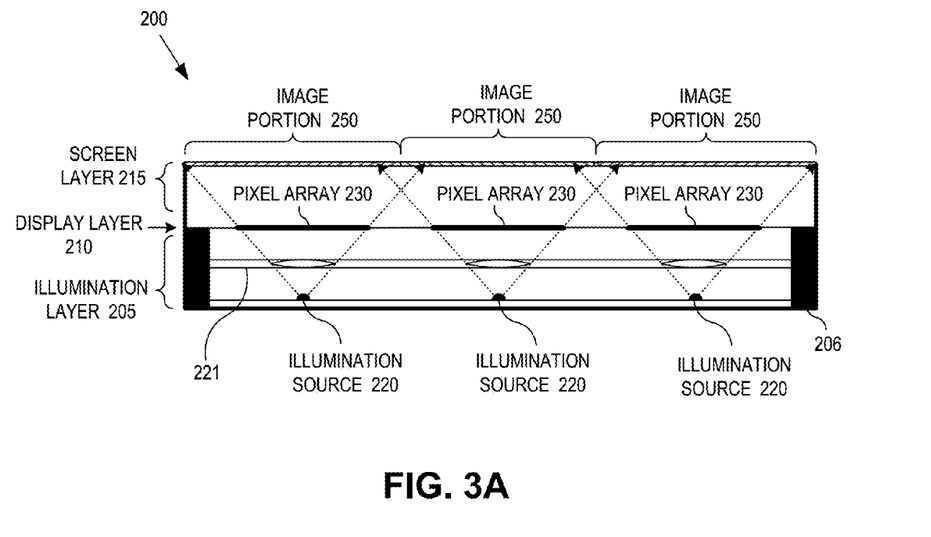
FIG. 3A is a cross-sectional view of functional layers of a rear projection display, in accordance with an embodiment of the disclosure.

FIGS. 2 and 3A illustrate functional layers of a rear projection display 200, in accordance with an embodiment of the disclosure. FIG. 2 is a perspective view of the layers of display 200 while FIG. 3A is a cross-section view of the same. The illustrated embodiment of display 200 includes an illumination layer 205, a display layer 210, and a screen layer 215. The illustrated embodiment of illumination layer 205 includes an array of illumination sources 220 and a lensing layer 221 (illustrated in FIG. 3A only for clarity). The illustrated embodiment of display layer 210 includes transmissive pixel arrays 230 separated from each other by spacing regions 235. The illustrated embodiment of screen layer 215 is divided into regions for displaying image portions 250 of an overall unified image. Rear projection display 200 is made up of a plurality of pixlets, which each includes an illumination source 220, pixel array 230, and a screen region for displaying an image portion 250 all aligned within a column through display 200.

In the illustrated embodiment, each illumination source 220 is aligned under a corresponding pixel array 230 to illuminate a backside of the corresponding pixel array with lamp light. Illumination sources 220 may be implemented as independent light sources (e.g., color or monochromatic LEDs, quantum dots, etc.) that emit light with a defined angular spread or cone to fully illuminate their corresponding transmissive pixel array 230 residing above on display layer 210. The illumination layer 205 and display layer 210 are separated from each other by a fixed distance 245 (e.g., 8 mm). This separation may be achieved using a transparent intermediary (e.g., glass or plastic layers) and may further include one or more lensing layers 221 (including lenses, apertures, beam confiners, etc.) to control or manipulate the angular extent and cross-sectional shape of the lamp light emitted from illumination sources 220. In one embodiment, an illumination controller may be coupled to illumination sources 220 to control their illumination intensity. Illumination layer 205 may include a substrate upon which illumination sources 220 are disposed.

Transmissive pixel arrays 230 are disposed on the display layer 210 and each includes an array of transmissive pixels (e.g., 100 pixels by 100 pixels). In one embodiment, the transmissive pixels may be implemented as backlit liquid crystal pixels. Each transmissive pixel array 230 is an independent display array that is separated from adjacent transmissive pixel arrays 230 by spacing regions 235 on display layer 210. The internal spacing regions 235 that separate adjacent pixel arrays 230 from each other may be twice the width as the perimeter spacing regions 235 that separate a given pixel array 230 from an outer edge of display layer 210. In one embodiment, the internal spacing regions 235 have a width of 4 mm while the perimeter spacing regions 235 have a width of 2 mm. Of course, other dimensions may be implemented.

As illustrated, transmissive pixel arrays 230 are spaced across display layer 210 in a matrix with spacing regions 235 separating each transmissive pixel array 230. In one embodiment, transmissive pixel arrays 230 each represent a separate and independent array of display pixels (e.g., backlit LCD pixels). Spacing region 235 are significantly larger than the inter-pixel separation between pixels of a given transmissive pixel array 230. Spacing regions 235 provide improved flexibility for routing signal lines or the inclusion of additional circuitry, such as a display controller. Spacing regions 235 that reside along the exterior perimeter of display layer 210 also provide space for the bezel trim 206 of display 200. Bezel trim 206 operates as the sides of the housing for display 200. The spacing regions 235 that reside along the exterior perimeter also provide space for power and/or communication ports.

Although FIG. 2 illustrates display layer 210 as including six transmissive pixel arrays 230 arranged into two rows and three columns, it should be appreciated that various implementations of display 200 may include more or less transmissive pixel arrays 230 organized into differing combinations of rows and columns. As such, in embodiments having a one-to-one ratio of illumination sources 220 to transmissive pixel arrays 230, the number and layout of illumination sources 220 on illumination layer 205 may also vary. While FIG. 2 does not illustrate intervening layers between the three illustrated layers for the sake of clarity, it should be appreciated that embodiments may include various intervening optical or structural sub-layers, such as lens arrays, transparent substrates to provide mechanical rigidity and optical offsets, protective layers, or otherwise. Further details of the sub-layers of various embodiments of screen layer 215 are discussed below.

Figure 3B:
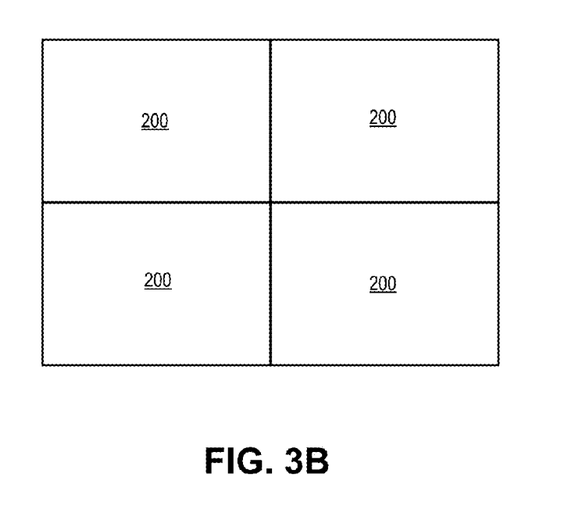
FIG. 3B illustrates how rear projection displays can be tiled to form larger seamless displays, in accordance with an embodiment of the disclosure.

Transmissive pixel arrays 230 are switched under control of a display controller to modulate the lamp light and project image portions 250 onto a backside of screen layer 215. In various embodiments, screen layer 215 includes matte material (or other diffusing material suitable for rear projection) that is disposed on a transparent substrate providing mechanical support. Image portions 250 collectively blend together on screen layer 215 to present a unified image to a viewer from the viewing side of screen layer 215 that is substantially without seams. In other words, the images created by transmissive pixel arrays 230 are magnified as they are projected across separation 255 (e.g., 2 mm) between display layer 210 and screen layer 215. The image portions 250 are magnified enough to extend over and cover spacing regions 235 forming a seamless unified image. The magnification factor is dependent upon separation 255 and the angular spread of the lamp light emitted by illumination sources 220. In one embodiment, image portions 250 are magnified by a factor of approximately 1.5. Not only does the unified image cover the internal spacing regions 235, but also covers the perimeter spacing regions 235. As such, display 200 may be positioned adjacent to other display tiles 200 and communicatively interlinked to form larger composite seamless displays, in which case the unified image generated by a single display tile becomes a sub-portion of a multi-tile unified image (e.g., see FIG. 3B).

In tiled rear-projection architecture, such as the one illustrated in FIGS. 2 and 3A, display light incident upon screen layer 215 is not collimated. This divergent light can result in angular brightness variations at different locations across screen layer 215. This deviation can be greatest around the perimeter of each image portion 250 defined by a given pixlet. Accordingly, FIGS. 4 and 7 discussed below describe a rear-projection screen architectures that accommodate non-collimated, obliquely incident display light while providing a relatively uniform angular brightness across the screen.

Figure 4:
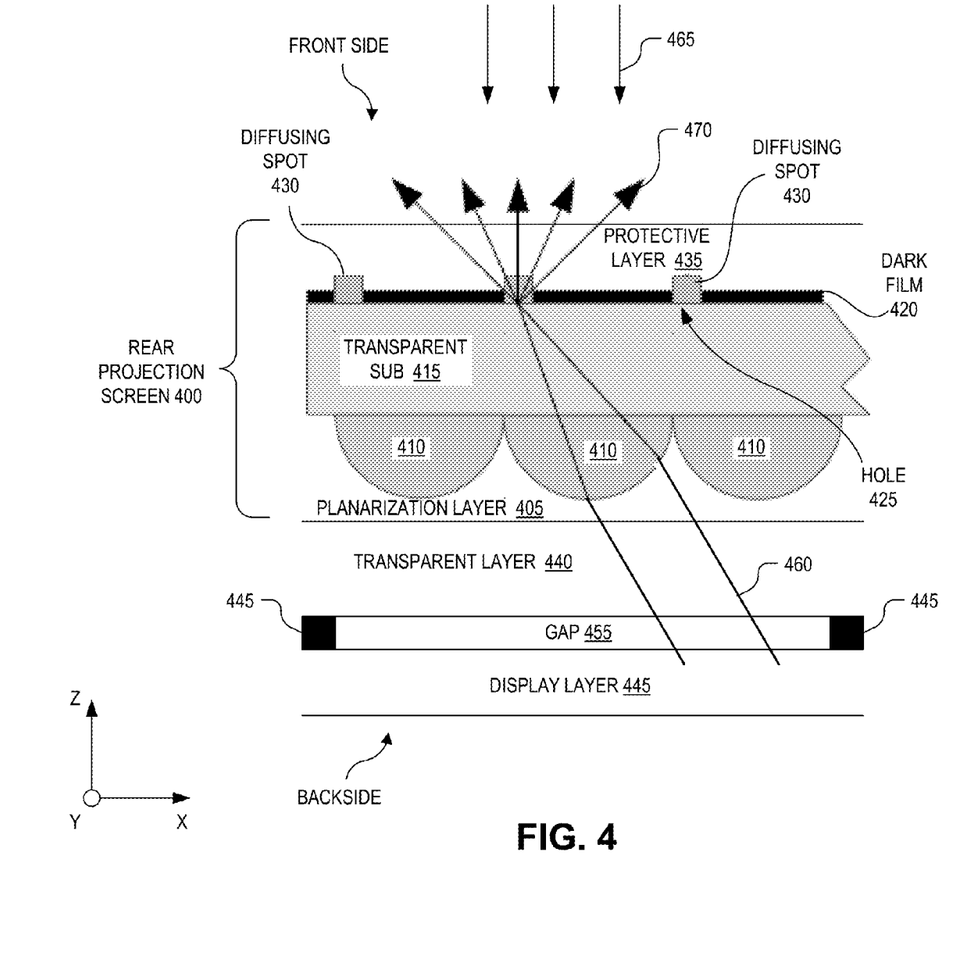
FIG. 4 is a cross-sectional view illustrating a portion of a rear projection screen, in accordance with an embodiment of the disclosure.

FIG. 4 is a cross-sectional view illustrating a portion of a rear projection screen 400, in accordance with an embodiment of the disclosure. Rear projection screen 400 is one implementation of screen layer 215 illustrated in FIGS. 2 and 3A; however, it should be appreciated that rear projection screen 400 is not limited for use with displays having the seamless tiling architecture illustrated in FIGS. 2 and 3A. Rather, rear projection screen 400 may be used with a variety of rear projection displays.

The illustrated embodiment of rear projection screen 400 includes a planarization layer 405, an array of lenses 410, a transparent substrate 415, a dark film 420 having an array of holes 425, an array of diffusing spots 430, and a protective layer 435. In the illustrated embodiment, projection screen 400 may be positioned over a transparent layer 440 (e.g., glass, acrylic, polycarbonate, plastic or other transparent substrates) that is offset from a display layer 445 using spacers 450 to form gap 455. For example, display layer 445 may represent display layer 210 illustrated in FIGS. 2 and 3A. It should be appreciated that FIG. 4 only illustrates a small cross-sectional portion of rear projection screen 400, which is a repeating structure that extends in the X and Y plane of FIG. 4.

Dark film 420 covers a majority of the front side of transparent substrate 415. Dark film 420 is a low reflectance material coated over the front side of transparent substrate 415 to reduce the amount of back reflections of ambient light 465, thereby increasing the contrast of projection screen 400. However, so as not to block the majority of image light 460 projected from display layer 445, lenses 410 focus and direct (e.g., converge) the incident image light 460 through corresponding holes 425. Lenses 410 are disposed across the backside of transparent substrate 415 in a two-dimensional ("2D") array to direct or focus backside incident image light 460 of an image projected from display layer 445 through holes 425 in dark film 420. In one embodiment, there is a one-to-one correspondence between lenses 410 and holes 425. Holes 425 are covered and/or filled with diffusing spots 430 that diffuse or scatter image light 460 to provide a uniform, wide viewing angle of the image from the front side projection screen 400. Thus, diffusing spots 430 re-diverge the image light 460, which was previously converged by lenses 410 to improve image uniformity and viewing angle. In one embodiment, diffusing spots 430 re-radiate image light 460 into the viewing region in front of rear projection screen 400 substantially as a Lambertian radiator.

Unlike the projection screens illustrated in FIGS. 1A-1D, image light 460 need not be directed along an optical path through lenses 410 that is normally incident through transparent substrate 415 and normal to dark film 420. As such, a Fresnel lens is not necessary to redirect obliquely incident image light to a normal incidence. Rather, the oblique incidence of image light 460 onto the backside of dark film 420 is retained. Instead, diffusing spots 430 are used to transform the highly directional and oblique image light 460 into diffuse or divergent image light 470 (e.g., Lambertian light) that can be perceived from a wide range of viewing angles with angular uniformity. The elimination of a Fresnel lens reduces the fabrication complexity and cost of rear projection screen 400. Furthermore, the elimination of a Fresnel lens avoids the alignment issues between the Fresnel lens and each illumination source 220 that can arise in the tileable display architecture illustrated in FIGS. 2 and 3A.

Transparent layer 440 may be fabricated using a pane of a glass, acrylic, polycarbonate, or other plastic has a thickness that is selected to achieve a desired magnification factor of the divergence image light 460 projected from display layer 445. Similarly, transparent substrate 415 may be also be fabricated of glass, acrylic, polycarbonate, or other plastic and has a thickness that corresponds to the approximate average focal length of lenses 410 such that the majority of image light 460 is directed through holes 425. In one embodiment, the optical power of lenses 410 may vary to accommodate the variable length optical paths due to the divergence of image light 460. For example, in one embodiment, lenses 410 may have increasing focal lengths (decreasing optical power) the closer they are to the perimeter of a given pixlet or the further off-center from their corresponding illumination source.

The array of lenses 410 may be formed using a variety of techniques. In one embodiment, the array of lens shapes are molded into planarization layer 405, filled with an optical adhesive having a different refractive index (e.g., higher index of refraction than planarization layer 440) and bonded to the backside of transparent substrate 415. In another embodiment, lenses 410 are deposited using a high index polymer material onto transparent substrate 415 that is patterned and reflowed into near semi-spherical elements such as microlenses. Subsequently, a transparent lower index polymer material may be formed over the array of lenses 410 to form planarization layer 405. Of course, standoff inserts may be used between transparent layer 440 and transparent substrate 415 instead of (or in addition to) planarization layer 405. Other lens array fabrication techniques may be used.

Diffusing spots 430 are fabricated of a diffuse or optically scattering material. For example, diffusing spots 430 may be fabricated of light diffusing particles suspended within a photoresist that is patterned to coincide with holes 425. The light diffusing particles may be a suspension of polytetrafluroethylene ("PTFE") particles or a mixture of Barium sulfate. Alternatively, a diffuse light color paint may be filled into each hole 425. For example, the dark film 420 may be a matte black film that has an array of diffuse white or light colored spots therein. Diffusing spots 430 may extend above a top surface of dark film 420 (illustrated) or be flush or even recessed with the top surface of dark film 420; however, raised or flush embodiments may provide improved light scattering characteristics for divergent image light 470.

In alternative embodiments, diffusing spots 430 may be formed of re-radiative material such as phosphor or quantum dots. In these embodiments, image light 460 may be stimulate the re-radiative material with a pump wavelength (e.g., ultraviolet) and the phosphor or quantum dots re-radiate in the visible spectrum. Re-radiative embodiments may include forming red (R), green (G), blue (B) patterns of phosphor or quantum dots using diffusing spots 430 to form a color screen. In these re-radiative color embodiments, each hole 425 may correspond to a particular RGB color with a RGB or RGGB group corresponding to a color macropixel group. Additionally, the a filter layer (not illustrated) may be disposed between dark film 420 and transparent substrate 415 that passes the pump wavelength but blocks back reflections of the RGB wavelengths to prevent deleterious cross-talk between holes 425.

In one embodiment, the array of lenses 410 and the array of diffusing spots 430 are regular arrays each with a constant separation pitch. In one embodiment, the separation pitch between adjacent diffusing spots 430 is greater than the separation pitch between adjacent lenses 410. The greater separation pitch of diffusing spots 430 (and holes 425) accommodates divergent oblique angles for image light 460. In this embodiment, the center diffusing spot 430 that is directly positioned over an illumination source or backlight for display layer 445 is vertically aligned with its corresponding lens 410, since the image light ray for this pixel is normally incident. However, the larger separation pitch of diffusing spots 430 results in a linearly increasing offset between diffusing spots 430 and their corresponding lens 410 with distance from the centrally aligned diffusing spot 430. This increasing offset accommodates non-collimated backlighting from a near point source, as used in the tileable architecture illustrated in FIGS. 2 and 3A. In rear-projection embodiments that use collimated backlighting, the separation pitch of diffusing spots 430 and lenses 410 may be equivalent.

Figure 5:
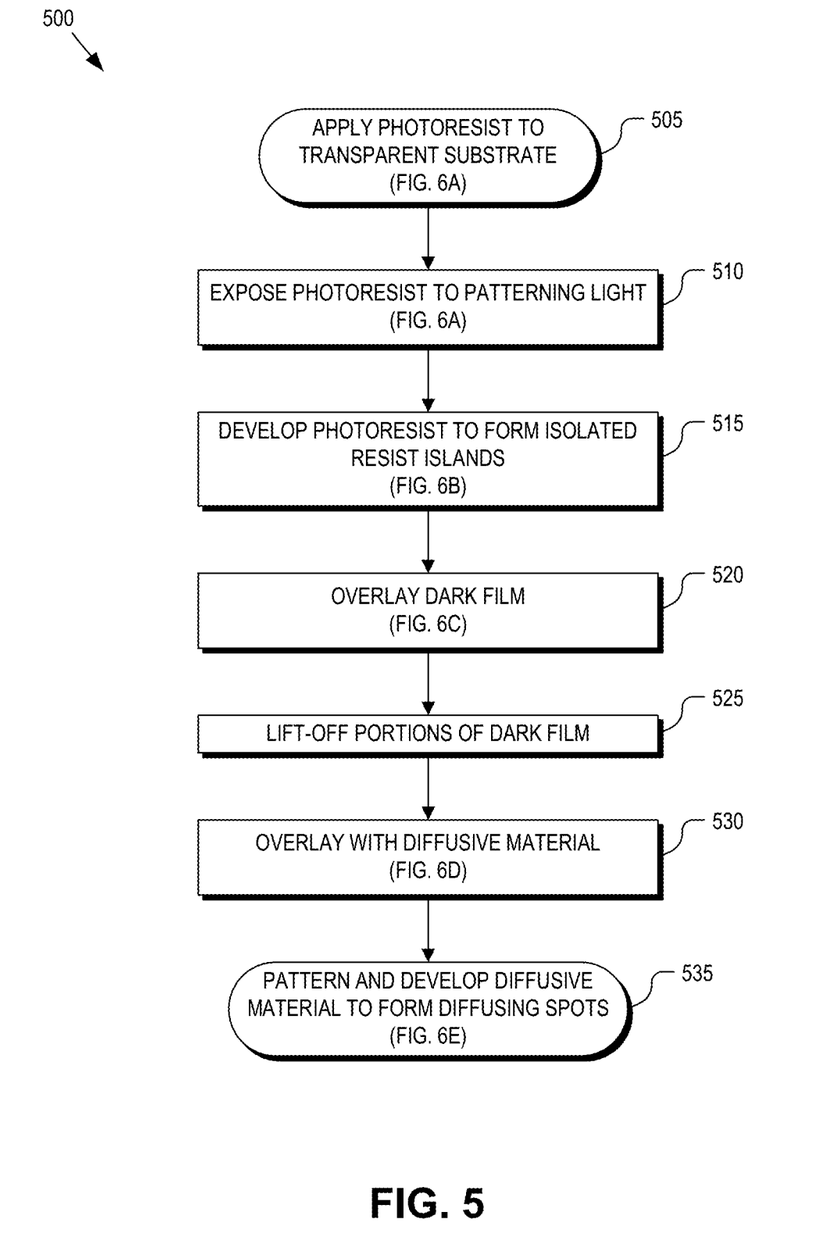
FIG. 5 is a flow chart illustrating a process for fabricating a rear projection screen, in accordance with an embodiment of the disclosure.

FIG. 5 is a flow chart illustrating a process 500 for fabricating rear projection screen 400, in accordance with an embodiment of the disclosure. The order in which some or all of the process blocks appear in process 400 should not be deemed limiting. Process 500 is described with reference to FIGS. 6A to 6DE. Rather, one of ordinary skill in the art having the benefit of the present disclosure will understand that some of the process blocks may be executed in a variety of orders not illustrated, or even in parallel.

Figure 6A:
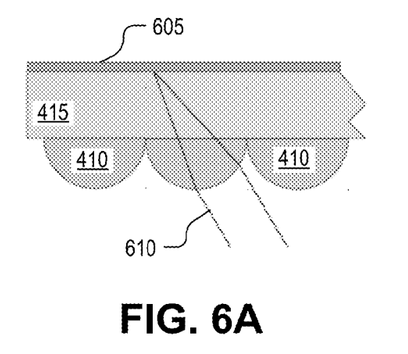
FIGS. 6A to 6E illustrate different stages of fabrication of a rear projection screen, in accordance with an embodiment of the disclosure.
Figure 6B:
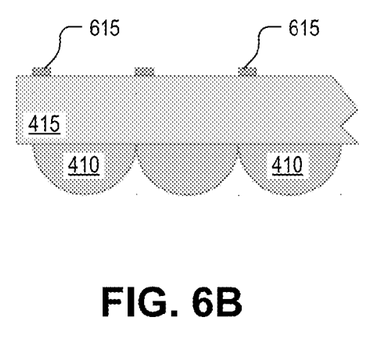
Figure 6C:
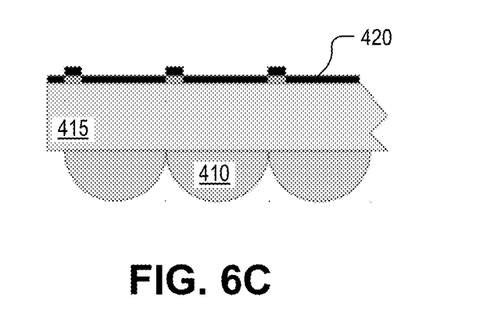
Figure 6D:
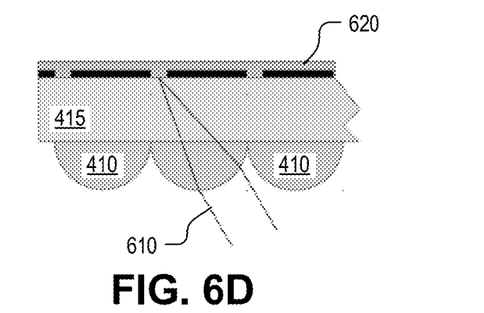
Figure 6E:
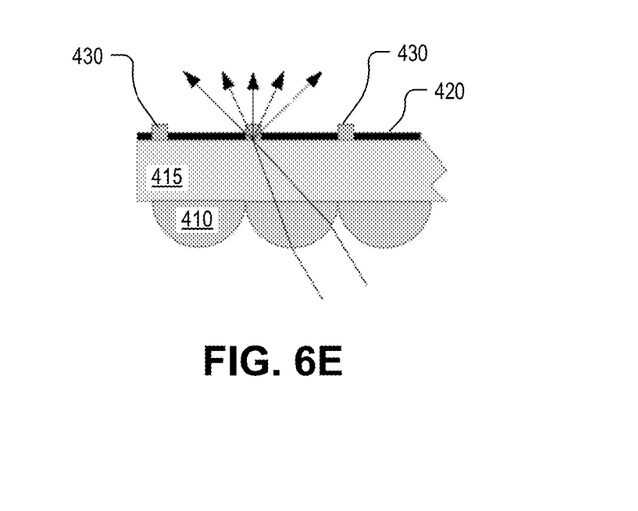

In a process block 505, a layer of photoresist 605 is applied to the front side of transparent substrate 415 already having a replicated array of lenses 410 disposed on its backside (see FIG. 6A). In one embodiment, photoresist 605 is a layer of positive photoresist. In a process block 510, photoresist 605 is exposed to patterning light 610 (see FIG. 6A). The angle of patterning light 610 matches the angle for each image pixel that display light 460 will follow during operational use of projection screen 400. In a process block 515, the exposed layer of photoresist 605 is developed, leaving behind a mask of isolated resist islands 615 that are each self-aligned with their corresponding lens 410 (FIG. 6B). In a process block 520, the front side of transparent substrate 415 is then overlaid with a layer of dark film 420 (FIG. 6C). Dark film 420 may be fabricated of the same material used in masking pixels in liquid crystal displays ("LCDs"). In a process block 525, the portions of dark film 420 residing on isolated resist island 615 are removed using a lift-off process. This leaves behind an array of pinholes (e.g., holes 425) through dark film 420 that is optically aligned to the array of lenses 410. In a process block 530, the front side of the transparent substrate 415 is once again overlaid with a layer of diffusing material 620 (FIG. 6D). In one embodiment, diffusive material 620 is a modified photoresist that includes a suspension of diffusing particles (e.g., polytetrafluroethylene (PTFE), Barium sulfate, etc.). Finally, in a process block 535, diffusive material 620 is once again exposed to patterning light 610 (FIG. 6E) from the backside and developed to create diffusing spots 430 (FIG. 6E).

In other embodiments, diffusive material 620 may be ultraviolet curable cement with a suspension or empregnation of diffusing particles. In yet another embodiment, diffusive material 620 may include phosphor that is lithographically patterned from the front side to build regions of red, green, and blue phosphors. In another embodiment, diffusive material 620 may include quantum dot particles. In another embodiment, diffusive material 620 is a matte light colored (e.g., white) paint that is selectively applied over holes 425 or blanket applied and selectively removed.

Figure 7:
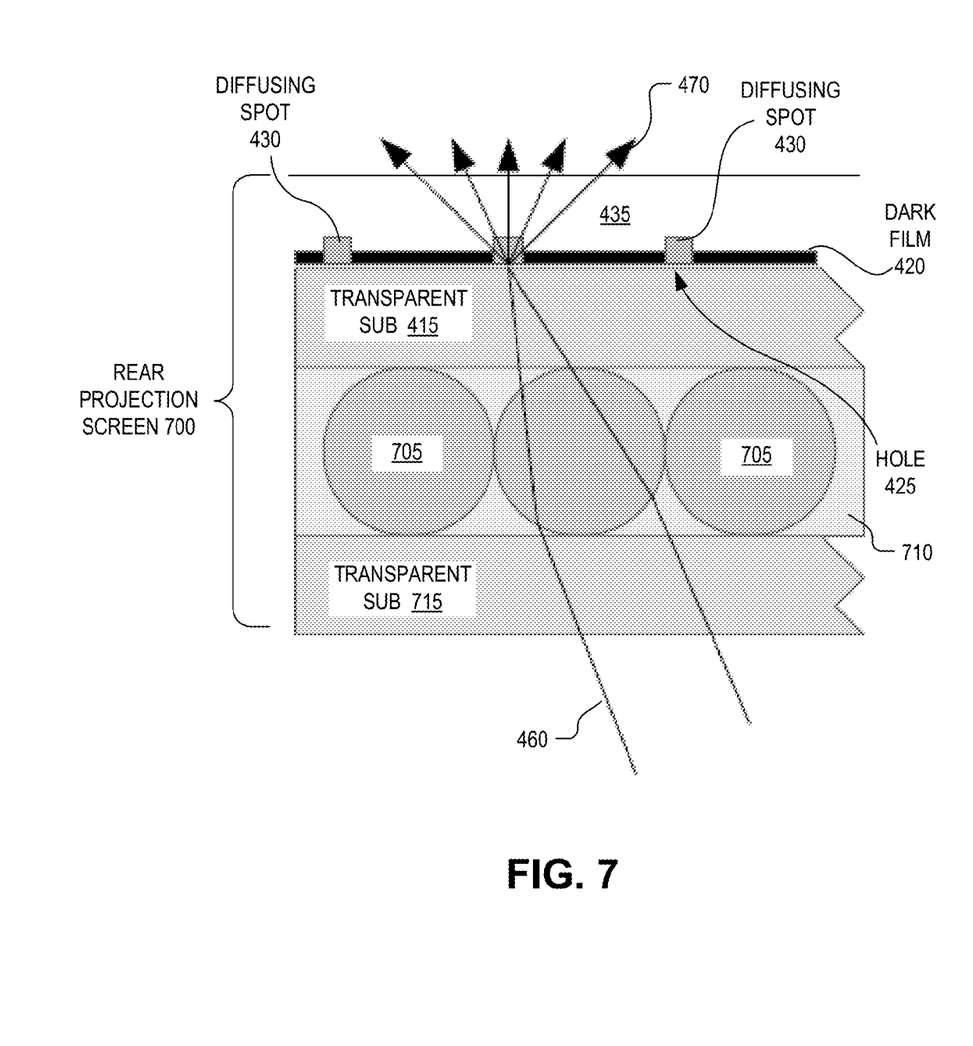
FIG. 7 is a cross-sectional view illustrating a portion of a rear projection screen, in accordance with another embodiment of the disclosure.

FIG. 7 is a cross-sectional view illustrating a portion of a rear projection screen 700, in accordance with another embodiment of the disclosure. Rear projection screen 700 is similar to rear projection screen 400, but uses a different multi-layer structure to implement an array of lenses on the backside of transparent substrate 415. In particular, rear projection screen 700 implements an array of lenses with an array of dual-sided lenses 705 surrounded by a transparent mortar material 710 which is sandwiched between transparent substrate 415 and another transparent substrate 715 (e.g., glass, acrylic, polycarbonate, or other plastic). The dual-sided lenses 705 may be fabricated of glass beads or polymer material having a higher index of refraction than transparent mortar material 710, which itself may be fabricated of a polymer material. Dual-sided lenses 705 may provide higher optical power for a narrower transparent substrate 415 or facilitate collimation of the chief ray of image light 460. Of course, other structures for implementing a 2D array of lenses may also be used.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A projection screen, comprising:
    a transparent substrate having a first side and a second side;
    an array of lenses disposed along the first side of the transparent substrate;
    a dark film disposed across the second side of the transparent substrate;
    an array of holes disposed through the dark film; and
    an array of diffusing spots each aligned with a corresponding one of the array of holes,
    wherein the array of lenses are each separated by a first separation pitch and the array of holes are each separate by a second separation pitch, wherein the first and second separation pitches are different.

2. The projection screen of claim 1, wherein the array of diffusing spots comprises diffusing material disposed in or on each of the holes disposed through the dark film.

3. The projection screen of claim 2, wherein the diffusing material comprises light diffusing particles suspended within a photoresist that is patterned into the array of holes.

4. The projection screen of claim 3, wherein the light diffusing particles comprises at least one of polytetrafluroethylene particles or Barium sulfate.

5. The projection screen of claim 2, wherein the diffusing spots comprise a light color paint.

6. The projection screen of claim 2, wherein the diffusing material fills each of the holes in the dark film and rises above a front side surface of the dark film.

7. The projection screen of claim 1, wherein the array of lenses correspond to the array of holes on a one-to-one basis.

8. The projection screen of claim 1, wherein each lens of the array of lenses is aligned to focus display light incident on a rear side of the projection screen through a corresponding one the array of holes and wherein the array of diffusing spots scatters the display light for emission out a front side of the projection screen.

9. The projection screen of claim 1, wherein the second separation pitch of the array of holes is larger than the first separation pitch of the array of lenses to accommodate display light incident on the array of lenses from a rear side of the projection screen that is divergent.

10. The projection screen of claim 1, wherein the array of lenses comprises:
    an array of microlenses having a first refractive index disposed along the first side of the transparent substrate; and
    a planarization material having a second refractive index surrounding the array of microlenses, wherein the first refractive index is different than the second refractive index.

11. The projection screen of claim 1, wherein the array of lenses comprises:
    an array of double-sided microlenses having a first refractive index disposed along the first side of the transparent substrate; and
    a transparent material having a second refractive index surrounding the array of double-sided microlenses, wherein the first refractive index is different than the second refractive index.

12. The projection screen of claim 1, wherein the diffusing spots include phosphor or quantum dots.

* * * * *